(12) United States Patent
Janakiraman et al.

(10) Patent No.: US 9,785,311 B2
(45) Date of Patent: *Oct. 10, 2017

(54) DYNAMICALLY ORGANIZING APPLICATIONS BASED ON A CALENDAR EVENT

(71) Applicant: International Business Machines Corporation, Armonk, NY (US)

(72) Inventors: Janani Janakiraman, Austin, TX (US); Dany R Madden, Beaverton, OR (US); Meenakshi Sripal, Saint Louis, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,863

(22) Filed: Feb. 10, 2016

(65) Prior Publication Data

US 2016/0162132 A1    Jun. 9, 2016

Related U.S. Application Data

(63) Continuation of application No. 14/088,159, filed on Nov. 22, 2013.

(51) Int. Cl.
*G06F 17/30* (2006.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ....... G06Q 10/06311; G06Q 10/06314; G06Q 10/107; G06Q 10/109; G06Q 10/1093; Y10S 707/951
See application file for complete search history.

(56) References Cited

U.S. PATENT DOCUMENTS 8,601,370 B2 * 12/2013 Chiang ............... G06F 3/04817
715/700
8,994,731 B2 * 3/2015 Nevins .............. G06F 17/30551
345/440

(Continued)

OTHER PUBLICATIONS

U.S. Appl. No. 14/088,159, filed Nov. 22, 2013, Notice of Allowance mailed Apr. 8, 2016.

(Continued)

*Primary Examiner* — Cheryl Lewis
(74) *Attorney, Agent, or Firm* — Kunzler Law Group; Steven L. Bennett

(57) ABSTRACT

A method for dynamically organizing applications based on a calendar event includes presenting a plurality of icons on an electronic display of a mobile device. Each icon of the plurality of icons represents an application configured to execute on the mobile device. The method further includes identifying an upcoming calendar event on a calendar linked to the mobile device and determining if there is a correlation between the application and the calendar event by comparing one or more characteristics of the application to one or more characteristics of the calendar event. The method also includes positioning the plurality of icons on the electronic display according to the determined correlation between the application and the calendar event such that icons representing applications having a positive correlation to the calendar event are positioned to be more visible than icons representing applications that do not have a positive correlation to the calendar event.

10 Claims, 5 Drawing Sheets

(51) Int. Cl.
    *G06F 3/0481*     (2013.01)
    *G06F 3/0484*     (2013.01)
    *H04L 29/08*     (2006.01)
    *G06Q 10/06*     (2012.01)
    *G06Q 10/10*     (2012.01)

(52) U.S. Cl.
    CPC ........ *G06F 17/30985* (2013.01); *H04L 67/02* (2013.01); *G06Q 10/06311* (2013.01); *G06Q 10/06314* (2013.01); *G06Q 10/107* (2013.01); *G06Q 10/109* (2013.01); *G06Q 10/1093* (2013.01); *Y10S 707/951* (2013.01)

(56) References Cited

U.S. PATENT DOCUMENTS

| | | | |
|---|---|---|---|
| 9,092,109 B2* | 7/2015 | Carroll | G06Q 10/107 |
| 2005/0138564 A1 | 6/2005 | Fogg | |
| 2007/0271155 A1* | 11/2007 | Rouda | G06Q 30/00 705/26.1 |
| 2013/0014040 A1 | 1/2013 | Jagannathan et al. | |
| 2014/0035949 A1* | 2/2014 | Singh | G06Q 10/109 345/629 |
| 2014/0237376 A1* | 8/2014 | Cassano | G06F 9/44 715/744 |
| 2015/0193391 A1* | 7/2015 | Khvostichenko | G06Q 10/00 715/205 |

OTHER PUBLICATIONS

U.S. Appl. No. 14/088,159, filed Nov. 22, 2013, Office Action Mailed Jul. 5, 2016.

\* cited by examiner

DYNAMICALLY ORGANIZING APPLICATIONS BASED ON A CALENDAR EVENT

FIELD

The subject matter disclosed herein relates to mobile device applications and more particularly relates to dynamically organizing applications based on a calendar event.

BACKGROUND

Mobile devices, such as smart phones and tablet computers, are able to store and execute various applications. These applications may be represented by icons displayed on a display of the mobile device. The number of applications available on a mobile device continues to increase while the available viewing area of the electronic device remains relatively constant. Thus, it may be difficult to sift through the numerous icons displayed on the electronic device in order to find a desired application. Current solutions may include different methods of organizing icons, grouping icons, etc. However, these solutions do not relieve the user from sorting through numerous icons until a desired application is found.

BRIEF SUMMARY

A method for dynamically organizing applications based on a calendar event. An apparatus and computer program product also perform the functions of the method. The method for dynamically organizing applications based on a calendar event includes presenting a plurality of icons on an electronic display of a mobile device. In one embodiment, each icon represents an application configured to execute on the mobile device. In another embodiment, the method includes identifying an upcoming calendar event on a calendar linked to the mobile device.

In a further embodiment, the method includes determining if there is a correlation between the application and the calendar event by comparing one or more characteristics of the application to one or more characteristics of the calendar event. The method, in another embodiment, includes positioning the plurality of icons on the electronic display according to the determined correlation between the application and the calendar event. In certain embodiments, icons of the plurality of icons representing applications having a positive correlation to the calendar event are positioned to be more visible than icons of the plurality of icons representing applications that do not have a positive correlation to the calendar event. In another embodiment, the icons are positioned at a time before the occurrence of the calendar event.

The method, in one embodiment, includes positioning pre-event icons a predetermined amount of time prior to positioning non-pre-event icons such that pre-event icons are more visible than non-pre-event icons. In some embodiments, at least a portion of the icons representing applications having a positive correlation to the calendar event are pre-event icons representing pre-event applications. In one embodiment, a pre-event application includes an application determined to be useful during a period of time just prior to the calendar event.

The method, in another embodiment, includes positioning post-event icons a predetermined amount of time after the occurrence of the event such that post-event icons are more visible than non-post-event icons. In one embodiment, at least a portion of the icons representing applications having a positive correlation to the calendar event are post-event icons representing post-event applications. In some embodiments, a post-event application includes an application determined to be useful during a period of time just after the calendar event.

In some embodiments, the icons of the plurality of icons representing applications having a positive correlation to the calendar event are positioned on one of a designated area of the electronic display and an available area on a designated home page of the electronic display. In another embodiment, the method includes positioning the plurality of icons on the electronic display according to an application being used during a previous calendar event. In one embodiment, the previous calendar event is substantially similar to the upcoming calendar event such that icons of the plurality of icons representing applications that have been previously used are positioned to be more visible than icons of the plurality of icons representing applications that have not been previously used.

In certain embodiments, the method includes positioning the plurality of icons on the electronic display according to a location associated with the calendar event such that icons of the plurality of icons representing applications positively correlated to the location associated with the calendar event are positioned to be more visible than icons of the plurality of icons representing applications that are not positively correlated to the location associated with the calendar event. In another embodiment, the method includes resetting the positioned icons of the plurality of icons to an original position in response to an expiration of the calendar event.

In a further embodiment, an icon is configured to be a static icon such that the static icon cannot be positioned in response to positioning the plurality of icons. In another embodiment, the method includes ordering the positioned icons of the plurality of icons according to the determined correlation such that the positioned icons are ordered in descending order of correlation. In one embodiment, the one or more characteristics associated with the calendar event includes one or more of an event type, an event location, a name, a time, a keyword, and a description. In another embodiment, the one or more characteristics associated with the application includes one or more of user-defined metadata, application-defined metadata, an application name, a group name, and a description of the application.

In one embodiment, an icon group that includes a plurality of icons is positioned according to at least one application represented by an icon of the icon group having a positive correlation to the calendar event. In a further embodiment, the method includes correlating one or more applications with a calendar event in response to a user associating the one or more applications with the calendar event.

An apparatus is included with a display module configured to present a plurality of icons on an electronic display of a mobile device. In one embodiment, each icon represents an application configured to execute on the mobile device. In another embodiment, the apparatus includes an event module configured to identify an upcoming calendar event on a calendar linked to the mobile device.

In a further embodiment, the apparatus includes a correlation module configured to determine if there is a correlation between the application and the calendar event by comparing one or more characteristics of the application to one or more characteristics of the calendar event. The apparatus, in another embodiment, includes an organization module configured to position the plurality of icons on the electronic display according to the determined correlation between the application and the calendar event. In certain embodiments, icons of the plurality of icons representing applications having a positive correlation to the calendar event are positioned to be more visible than icons of the plurality of icons representing applications that do not have a positive correlation to the calendar event. In another embodiment, the icons are positioned at a time before the occurrence of the calendar event.

The apparatus, in one embodiment, includes a pre-event module configured to position pre-event icons a predetermined amount of time prior to positioning non-pre-event icons such that pre-event icons are more visible than non-pre-event icons. In some embodiments, at least a portion of the icons representing applications having a positive correlation to the calendar event are pre-event icons representing pre-event applications. In one embodiment, a pre-event application includes an application determined to be useful during a period of time just prior to the calendar event.

The apparatus, in another embodiment, includes a post-event module configured to position post-event icons a predetermined amount of time after the occurrence of the event such that post-event icons are more visible than non-post-event icons. In one embodiment, at least a portion of the icons representing applications having a positive correlation to the calendar event are post-event icons representing post-event applications. In some embodiments, a post-event application includes an application determined to be useful during a period of time just after the calendar event.

In one embodiment, the apparatus includes a prior-use module configured to position the plurality of icons on the electronic display according to an application being used during a previous calendar event. In one embodiment, the previous calendar event is substantially similar to the upcoming calendar event such that icons of the plurality of icons representing applications that have been previously used are positioned to be more visible than icons of the plurality of icons representing applications that have not been previously used.

In certain embodiments, the apparatus includes a location module configured to position the plurality of icons on the electronic display according to a location associated with the calendar event such that icons of the plurality of icons representing applications positively correlated to the location associated with the calendar event are positioned to be more visible than icons of the plurality of icons representing applications that are not positively correlated to the location associated with the calendar event. In a further embodiment, the apparatus includes a manual module configured to correlate one or more applications with a calendar event in response to a user associating the one or more applications with the calendar event.

A computer program product is included for dynamically organizing applications based on a calendar event. The computer program product includes a computer readable storage medium having program code embodied therein. The program code is readable and/or executable by a processor to execute the steps of the method. In one embodiment, the steps include presenting a plurality of icons on an electronic display of a mobile device. In one embodiment, each icon represents an application configured to execute on the mobile device. In another embodiment, the steps include identifying an upcoming calendar event on a calendar linked to the mobile device.

In a further embodiment, the steps include determining if there is a correlation between the application and the calendar event by comparing one or more characteristics of the application to one or more characteristics of the calendar event. The steps, in another embodiment, include positioning the plurality of icons on the electronic display according to the determined correlation between the application and the calendar event. In certain embodiments, icons of the plurality of icons representing applications having a positive correlation to the calendar event are positioned to be more visible than icons of the plurality of icons representing applications that do not have a positive correlation to the calendar event. In another embodiment, the icons are positioned at a time before the occurrence of the calendar event.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
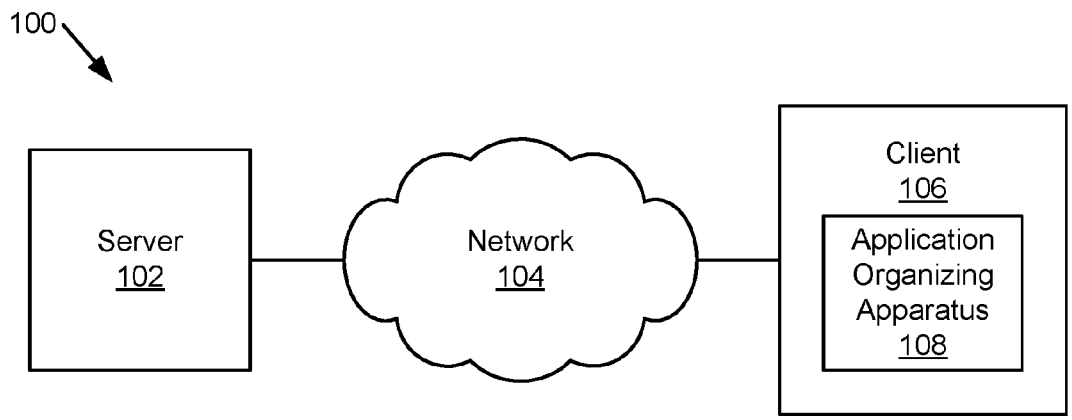
FIG. 1 is a schematic block diagram illustrating one embodiment of a system for dynamically organizing applications based on a calendar event.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for dynamically organizing applications based on a calendar event. In certain embodiments, the system 100 includes a server 102, a network 104, a client 106, and an application organizing apparatus 108, which are described in more detail below.

In one embodiment, the system 100 includes a server 102, which may be embodied as a desktop computer, a laptop computer, a main frame, a blade server, a cloud server, a rack server, and/or the like. A server 102, in another embodiment, includes a database server, a file server, a mail server, a print server, a web server, a gaming server, and/or the like. In certain embodiments, a server 102 stores data that is accessible to a plurality of clients 106 connected to the server 102 through the network 104. In another embodiment, a server 102 stores calendar events on a calendar.

In a further embodiment, the system 100 includes a network 104. The network 104, in one embodiment, is embodied as a digital communication network 104 that transmits digital communications between a plurality of devices, such as between a server 102 and a client 106. The digital communication network 104 may include a wireless network, such as a wireless telephone network, a local wireless network, such as a Wi-Fi network, a Bluetooth® network, and the like. The digital communication network 104 may include a wide area network ("WAN"), a storage area network ("SAN"), a local area network ("LAN"), an optical fiber network, the internet, or other digital communication network known in the art. The digital communication network 104 may include two or more networks. The digital communication network 104 includes one or more servers 102, routers, switches, and other networking equipment. The digital communication network 104 may also include computer readable storage media, such as a hard disk drive, an optical drive, non-volatile memory, random access memory ("RAM"), or the like.

In one embodiment, the system 100 includes clients 106, which may be embodied as mobile devices, such as tablet computers, smart phones, eBook readers, smart watches, optical head-mounted displays, and/or the like. In one embodiment, a client 106 includes one or more installed applications represented by one or more graphical icons displayed on an electronic display of the client 106. In certain embodiments, a client 106 communicates with the one or more servers 102 through the data network 104. In a further embodiment, a client 106 runs an instance of a program to communicate with and access data from a server 102. As used herein, a mobile device 106 may be used interchangeably with a client 106.

In another embodiment, the system 100 includes an application organizing apparatus 108. In certain embodiments, the application organizing apparatus 108 is configured to present a plurality of icons on an electronic display of a mobile device 106. The application organizing apparatus 108, in another embodiment, identifies an upcoming calendar event and determines whether there is a correlation between an application represented by an icon and the calendar event. In a further embodiment, the application organizing apparatus 108 positions the plurality of icons on the electronic display according to the determined correlation such that applications that have a positive correlation to the calendar event are positioned to be more visible than icons representing applications that do not have a positive correlation to the calendar event. In some embodiments, the application organizing apparatus 108 positions the icons at a time before the occurrence of the calendar event. In certain embodiments, the application organizing apparatus 108 includes one or more modules that perform the operations of the application organizing apparatus 108. The application organizing apparatus 108, including its associated modules, is described in more detail below with reference to FIGS. 2 and 3.

Figure 2:
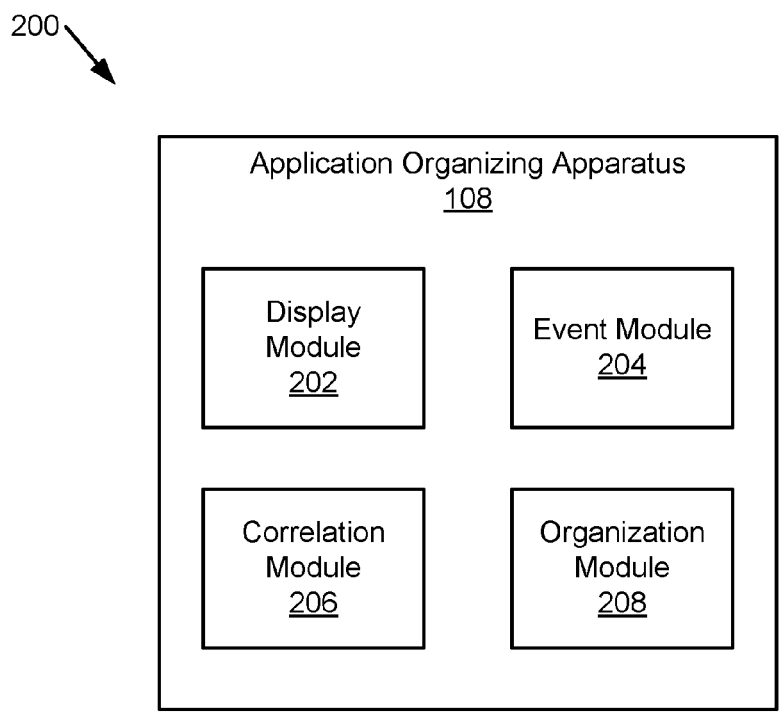
FIG. 2 is a schematic block diagram illustrating one embodiment of an apparatus for dynamically organizing applications based on a calendar event.

FIG. 2 depicts one embodiment of an apparatus 200 for dynamically organizing applications based on a calendar event. In one embodiment, the apparatus 200 includes one embodiment of an application organizing apparatus 108. The application organizing apparatus 108, in certain embodiments, includes a display module 202, an event module 204, a correlation module 206, and an organization module 208, which are described in more detail below.

In one embodiment, the application organizing apparatus 108 includes a display module 202 configured to present a plurality of icons on an electronic display of a mobile device 106. As used herein, an icon is a graphical representation of an application configured to execute on a mobile device 106. In certain embodiments, the display module 202 receives input from a user interacting with an icon. For example, a user may use a finger to select an icon on a mobile device 106 that includes a touch-enabled display. Alternatively, a user may use a device, such as a stylus, to interact with an icon.

In another embodiment, the application organizing apparatus 108 includes an event module 204 configured to identify an upcoming calendar event. In certain embodiments, the event module 204 receives a calendar event from a calendar linked to the mobile device 106. For example, the calendar may be located on the mobile device 106 and the event module 204 may access calendar events stored on the mobile device 106. In another example, the calendar may be located on a server 102, such as a cloud server (e.g., Google® Calendar, or the like), and the event module 204 may access the calendar events associated with the calendar through the network 104.

In certain embodiments, a calendar event contains metadata information associated with the event, such as a location for the event, a start time and/or an end time for the event, a description of the event, notes related to the event, and/or the like. In another embodiment, the event module 204 receives a calendar event created based on user input. For example, a user may manually enter a calendar event associated with a flight, a meeting, free time, a tee time, and/or the like. In another embodiment, the event module 204 receives a calendar event created by an application. For example, a calendar event may be created by an email application in response to an email containing scheduling information for an event. In another embodiment, a calendar event may be created based on a recurring calendar event. For example, a user may set up a weekly meeting at the same time, location, day of the week, or the like, as a recurring calendar event.

In one embodiment, the application organizing apparatus 108 includes a correlation module 206 configured to determine if there is a correlation between the application and the calendar event by comparing one or more characteristics of the application to one or more characteristics of the calendar event. In one embodiment, the characteristics associated with a calendar event include an event type, an event location, a name, a time, a keyword, a description, and/or the like. In another embodiment, the characteristics associated with an application include user-defined metadata, application-defined metadata, an application name, a group name, an application description, and/or the like. In some embodiments, the correlation module 206 associates a correlation score with an application based on the application's correlation to the calendar event.

In one embodiment, the correlation module 206, extracts one or more characteristics from the calendar event received by the event module 204 and compares the extracted characteristics to one or more characteristics of the application. For example, the correlation module 206 may extract information from a calendar event with a description "Flight to Los Angeles," such as the keyword "Flight" and the location "Los Angeles." In response to recognizing the keyword "Flight," the correlation module 206 may identify applications that contain characteristics associated with the keyword, such as an airline application that includes metadata related to the keyword "Flight." Similarly, the correlation module 206 may identify applications that contain characteristics associated with the location "Los Angeles," such as a map application, a hotel application, and/or the like.

In some embodiments, the correlation module 206 correlates an application with a calendar event based on the application being used previously with the same or a substantially similar calendar event. For example, the correlation module 206 may correlate a note-taking application with a weekly meeting on the calendar even though the correlation module 206 would not normally correlate the application with the calendar event based on the characteristics of the application and the calendar event.

In a further embodiment, the application organizing apparatus 108 includes an organization module 208 configured to dynamically position the plurality of icons on the electronic display according to the determined correlation between the application and the calendar event. For example, the organization module 208 may position an icon representing an airline application that is positively correlated with a calendar event describing an upcoming flight such that the icon is more visible than icons representing applications that are not positively correlated to the calendar event. Thus, in certain embodiments, the organization module 208 positions icons of the plurality of icons that represent applications that have a positive correlation to the calendar event to be more visible than icons of the plurality of icons that represent applications that do not have a positive correlation to the calendar event. In some embodiments, an icon is configured to be a static icon such that the organization module 208 cannot position the static icon. For example, a user may specify that their text messaging application always stay in the same position on the electronic display. Thus, the organization module 208 would not be allowed to move the text messaging application when positioning the icons.

In some embodiments, the organization module 208, in order to make icons more visible, positions the icons representing positively correlated applications on a designated area of the electronic display of the mobile device 106. In other words, the mobile device 106 may designate a portion of the electronic display as an area for dynamically positioned icons, such that icons representing applications having a positive correlation with a calendar event are positioned within the designated area. The organization module 208, in another embodiment, positions the icons representing positively correlated applications on an available area of a designated home page of the electronic display. For example, a mobile device 106 may include different "pages" that contain one or more icons. In such an embodiment, the organization module 208 may position icons representing applications that are positively correlated with the calendar event on the main page or home page of the electronic display, such that the more relevant applications are easily viewable and accessible. In some embodiments, the organization module 208 makes icons representing positively correlated applications visibly larger in order to make them more visible.

In certain embodiments, the organization module 208 positions the icons representing positively correlated applications at a time prior to the calendar event. For example, the organization module 208 may position an icon representing a note-taking application a predetermined time before a scheduled meeting begins. In certain embodiments, the organization module 208 sets the predetermined time prior to positioning an icon in response to user input. For example, a user may specify that the organization module 208 position the icons 15 minutes before the calendar event.

In one embodiment, the organization module 208 only positions icons representing applications that have a positive correlation with the calendar event above a certain threshold. In certain embodiments, the organization module 208 uses the correlation score associated with the applications by the correlation module 206 to determine whether to position an application's icon. For example, the organization module 208 may position icons representing applications having a correlation score greater than or equal to 0.5 and ignore icons representing applications having a correlation score below 0.5. In certain embodiments, the organization module 208 sets the correlation threshold in response to user input.

In one embodiment, the threshold is related to a number of icons that have been placed on the display of the mobile device 106. For example, where the display is divided into pages, the threshold may be set based on a number of icons that can fit on one page of the display with respect to the total number of icons on the display. For instance, if a display has five pages and each holds 10 icons and the user has filled all five pages with icons, the threshold may be set so that the top 10 icons are above the threshold. In another embodiment, a threshold is set to a number of icons that can be on one page as a maximum number of rearranged icons. For example, if 10 icons may fit on a page and only 8 icons are determined to have a positive correlation score, the organization module 208 may select the 8 icons with the positive correlation score to be reorganized instead of 10 icons. One of skill in the art will recognize other ways to determine which icons that the organization module 208 will rearrange.

In one embodiment, the organization module 208 positions a group of icons in response to at least one application represented by an icon of the icon group being positively correlated with the calendar event. For example, a group of applications having similar characteristics may be grouped together (e.g., such as in a folder represented by an icon). As long as one of the applications within the group has a positive correlation with the calendar event, the group of icons representing the applications may be positioned such that it is more visible than icons that do not have a positive correlation with the calendar event.

Figure 3:
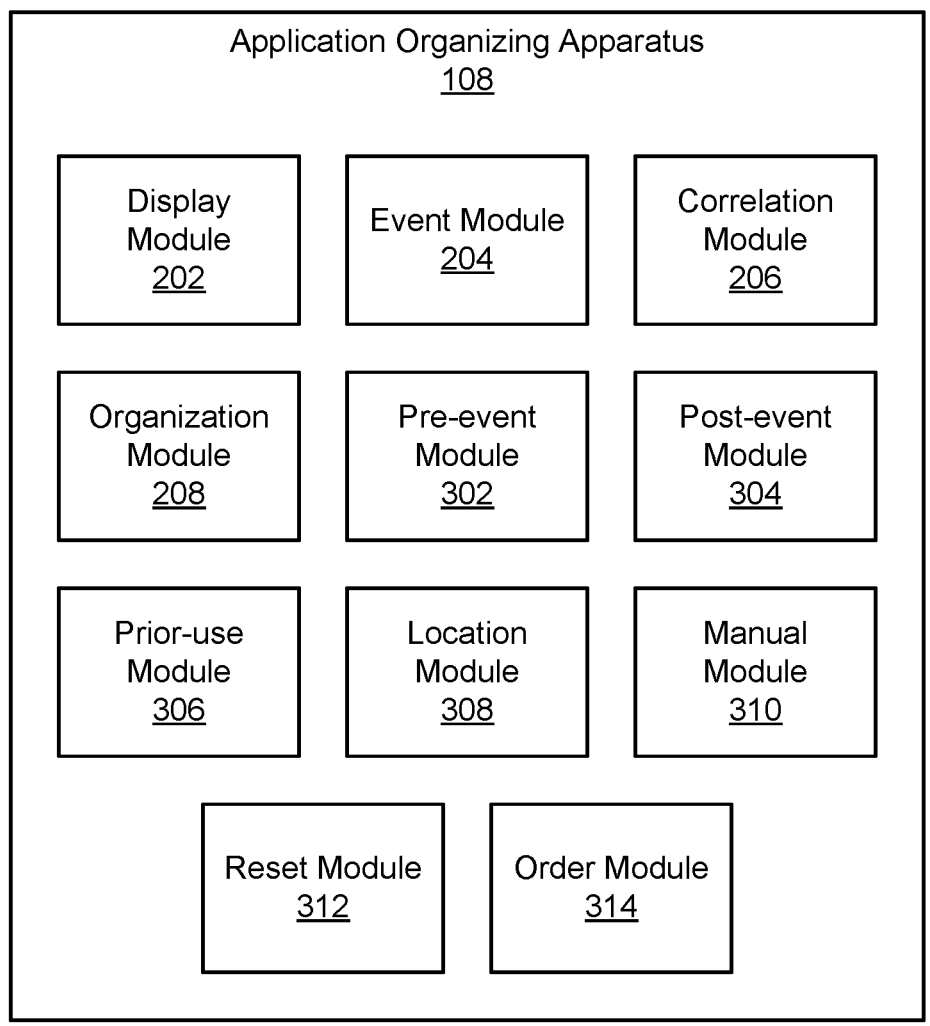
FIG. 3 is a schematic block diagram illustrating another embodiment of an apparatus for dynamically organizing applications based on a calendar event.

FIG. 3 depicts another embodiment of an apparatus 300 for dynamically organizing applications based on a calendar event. The apparatus 300, in one embodiment, includes an embodiment of an application organizing apparatus 108. In some embodiments, the application organizing apparatus 108 includes a display module 202, an event module 204, a correlation module 206, and an organization module 208, which are substantially similar to the display module 202, the event module 204, the correlation module 206, and the organization module 208 described above with reference to FIG. 2. The application organizing apparatus 108, in certain embodiments, includes a pre-event module 302, a post-event module 304, a prior-use module 306, a location module 308, a manual module 310, a reset module 312, and an order module 314, which are described below.

The application organizing apparatus 108, in one embodiment, includes a pre-event module 302 configured to position pre-event icons a predetermined amount of time prior to positioning non-pre-event icons such that pre-event icons are more visible than non-pre-event icons. In certain embodiments, the pre-event icons are a subset of all the icons presented on the electronic display of the mobile device 106. The pre-event icons, in some embodiments, represent pre-event applications, which is an application determined to be useful during a period of time just prior to the calendar event. In some embodiments, the pre-event applications have a positive correlation with the upcoming calendar event.

For example, the pre-event module 302 may position an icon representing a pre-event "flight check-in" application to a more visible position two hours before a scheduled flight on the calendar. Thus, the pre-event module 302 positions one or more pre-event icons representing applications that are useful a predetermined time before the calendar event such that they may be easily accessible and viewable. In some embodiments, the pre-event module 302 sets the predetermined amount of time based on user input. A user, for example, may specify that pre-event icons should be positioned one hour before an event is scheduled to occur.

The application organizing apparatus 108, in another embodiment, includes a post-event module 304 configured to position post-event icons a predetermined amount of time after the occurrence of the event such that post-event icons are more visible than non-post-event icons. In certain embodiments, the post-event icons are a subset of all the icons presented on the electronic display of the mobile device 106. The post-event icons, in some embodiments, represent post-event applications, which is an application determined to be useful during a period of time just after the calendar event. In some embodiments, the post-event applications have a positive correlation with the upcoming calendar event.

For example, the post-event module 304 may position an icon representing a post-event "taxi" application to a more visible position five minutes after a calendar event for a scheduled flight has ended. Thus, the post-event module 304 positions one or more post-event icons representing applications that are useful a predetermined time after the calendar event such that they may be easily accessible and viewable. In some embodiments, the post-event module 304 sets the predetermined amount of time based on user input. A user, for example, may specify that post-event icons should be positioned 10 minutes after a scheduled event occurs.

In certain embodiments, the application organizing apparatus 108 includes a prior-use module 306 configured to position the icons according to an application being used during a previous calendar event, which is substantially similar to the upcoming calendar event. In such an embodiment, the prior-use module 306 positions icons representing applications that have been previously used to be more visible than icons representing applications that have not been previously used, regardless the correlation score of the applications. For example, the prior-use module 306 may remember that a note-taking application was used during a meeting-type calendar event. Thus, whenever there is a calendar event that has similar characteristics as the meeting-type calendar event, the prior-use module 306 may position the note-taking application to a more visible position regardless the correlation score of the application.

In one embodiment, the application organizing apparatus 108 includes a location module 308 configured to position icons on the electronic display according to a location associated with the calendar event. In such an embodiment, the location module 308 positions icons representing applications that are positively correlated to the location associated with the calendar event to be more visible than icons representing applications that are not positively correlated to the location associated with the calendar event. For example, a calendar event for a flight to San Francisco may trigger the location module 308 to position icons representing applications with a positive correlation to San Francisco, such as a map application, a tourist application, a hotel application, a taxi application, and/or the like, to be more visible than applications that are not positively correlated to San Francisco. In certain embodiments, the mobile device's geolocation triggers the location module 308 to position icons representing applications with a positive correlation to the device's geolocation to be more visible.

In embodiment, the application organizing apparatus 108 includes a manual module 310 configured to correlate one or more applications with a calendar event in response to a user associating the one or more applications with the calendar event. For example, the manual module 310 may correlate a music application with a calendar event that would not normally be correlated with the music application in response to the user associating the music application with the calendar event. In certain embodiments, the manual module 310 receives one or more selected applications to correlate with a calendar event in response to a user selecting the applications when the calendar event is created.

In another embodiment, the application organizing apparatus 108 includes a reset module 312 configured to reset positioned icons to an original position in response to the expiration of the calendar event. For example, prior to a scheduled flight, the organization module 208 may position one or more icons representing applications having a positive correlation with the scheduled flight calendar event. After the event has expired, e.g., the end time has been reached, the reset module 312 may reset the icons to their original positions on the electronic display. In another embodiment, the reset module 312 resets the icons to an original position based on user input, such as a user manually resetting the layout of the icons. In one embodiment, the reset module 312 includes a button, command, etc. to allow the user to reset the icons to the original position. In another embodiment, the application organizing apparatus 108 includes a button, command, icon, etc. to return the icons to the rearranged condition as rearranged by the organization module 208. For example, the application organizing apparatus 108 may include a button to toggle the icons between the original icon positions and the rearranged condition as rearranged by the organization module 208.

In another embodiment, the application organizing apparatus 108 includes an order module 314 configured to order the positioned icons of the plurality of icons according to the determined correlation. In certain embodiments, the positioned icons are ordered in descending order of correlation. Thus, based on the correlation scores associated with the applications, the order module 314 may position the icons in order of correlation score such that the icon representing the application with the highest correlation score is listed first or most visible, the icon representing the application with the second-highest correlation score is listed second, and so on. The order module 314 may order the icons in a descending order by locating the icons according to visibility with the icons with the highest correlation positioned most visibly.

Figure 4:
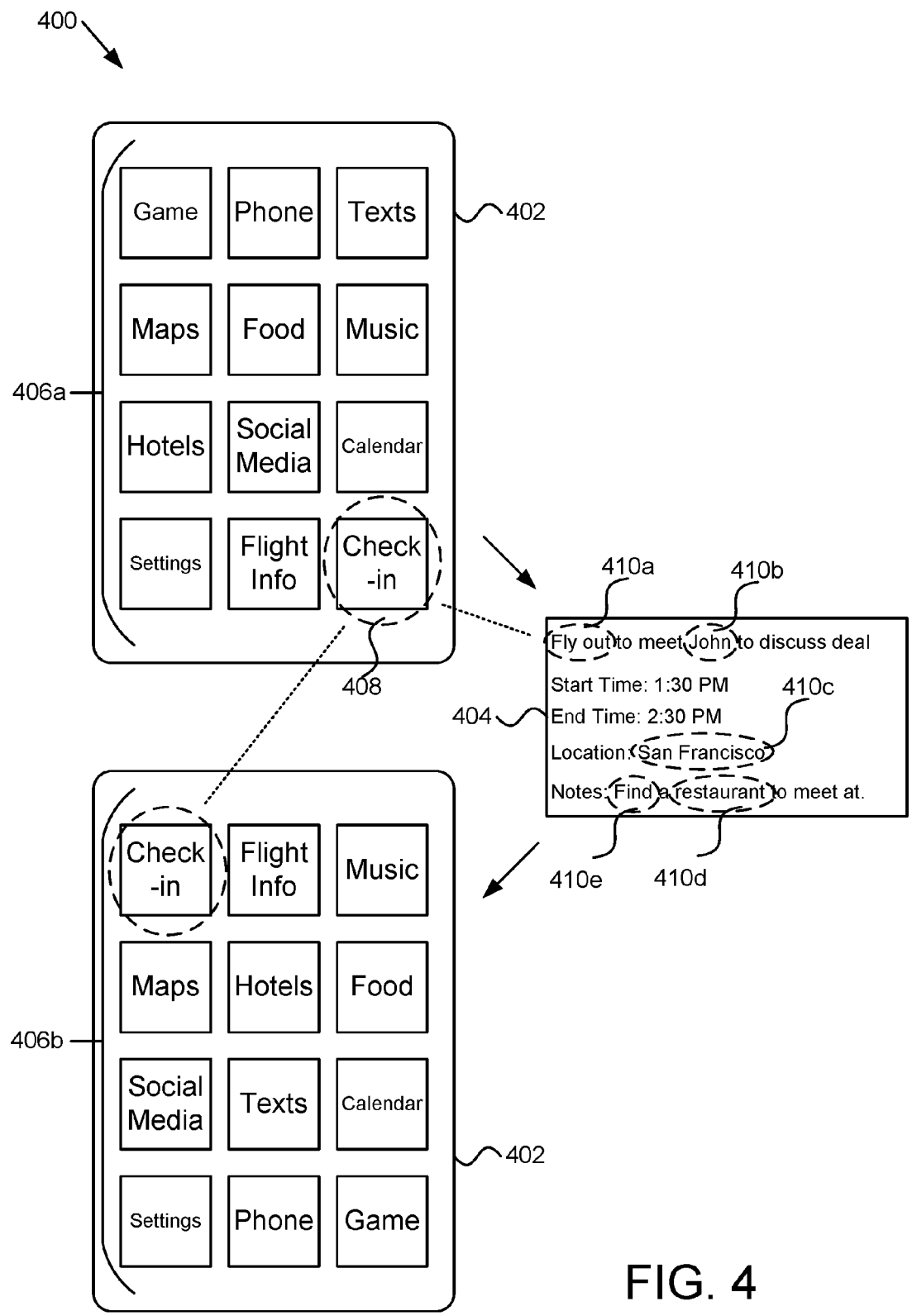
FIG. 4 is a schematic block diagram illustrating one embodiment of dynamically organizing applications based on a calendar event.

FIG. 4 depicts one embodiment of dynamically organizing applications based on a calendar event. The depicted embodiment includes a mobile device 402 that includes a plurality of icons 406a, 406b presented by the display module 202 on the electronic display of the mobile device 402. Also depicted is a calendar event 404 that may be identified by the event module 204. The event module 204 may extract certain characteristics from the calendar event 404, such as "Fly out" 410a, "John" 410b, "San Francisco" 410c, "restaurant" 410d, and "Find" 410e.

At a time prior to the calendar event 404, the correlation module 206 may determine a correlation between the applications represented by the icons 406a and the characteristics 410a-e of the calendar event 404. In the depicted embodiment, for example, the correlation module 206 may determine a positive correlation between the "check-in" application and the calendar event 404 based on the keyword "Fly-out." Thereafter, sometime prior to the calendar event 404, the organization module 208 may position the icons 406a such that icons 406b representing applications that are positively correlated with the calendar event 404 are positioned in a more visible area, such as near the top of the electronic display. As depicted in FIG. 4, the "check-in" application may have a high correlation with the calendar event 404 such that the organization module 208 positions the icon 408 associated with the application in a position at the top of the electronic display instead of at the bottom.

Figure 5:
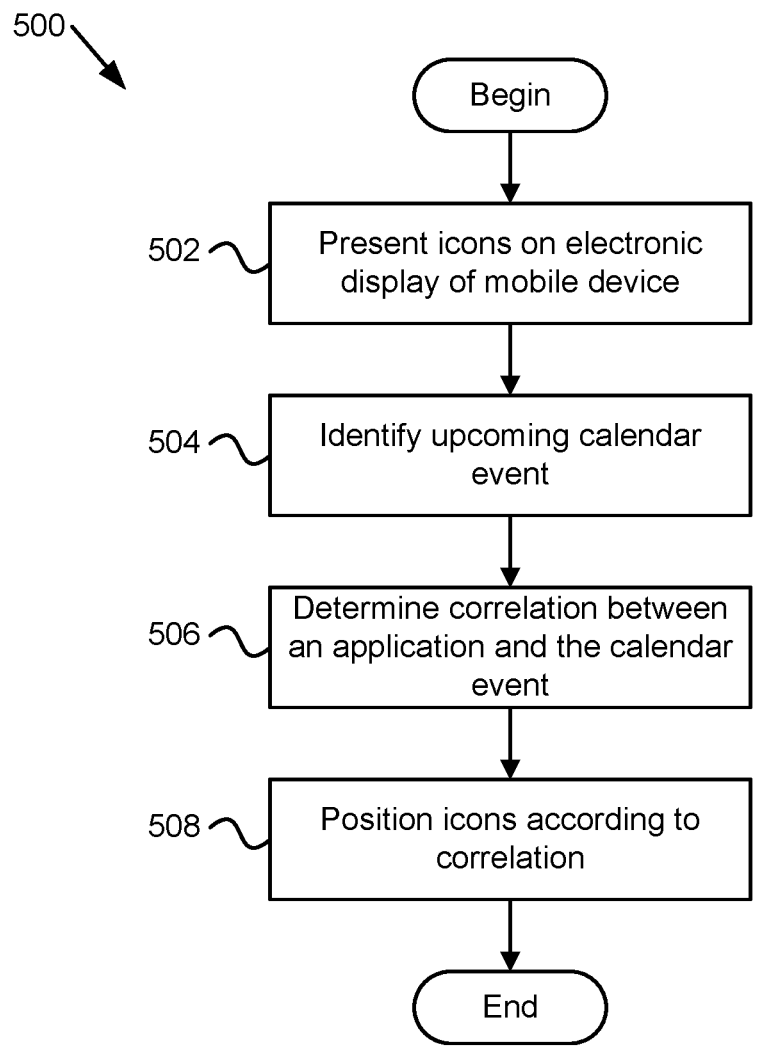
FIG. 5 is a schematic flow chart diagram illustrating one embodiment of a method for dynamically organizing applications based on a calendar event.

FIG. 5 depicts one embodiment of a method 500 for dynamically organizing applications based on a calendar event. In one embodiment, the method 500 begins and a display module 202 presents 502 a plurality of icons on an electronic display of a mobile device 106. In some embodiments, each icon represents an application configured to execute on the mobile device 106. In a further embodiment, an event module 204 identifies 504 an upcoming calendar event, which is on a calendar linked to the mobile device 106.

In one embodiment, a correlation module 206 determines 506 a correlation between the application and the calendar event by comparing one or more characteristics of the application to one or more characteristics of the calendar event. The characteristics of the application may include metadata, either user-defined or application-defined, an application name, an application type, and/or the like. The characteristics of the calendar event may include an event type, an event name, an event location, and/or the like.

An organization module 208, in another embodiment, positions 508 the plurality of icons on the electronic display according to the determined correlation between the application and the calendar event. In some embodiments, the organization module 208 positions icons of the plurality of icons representing applications having a positive correlation to the calendar event to be more visible than icons of the plurality of icons representing applications that do not have a positive correlation to the calendar event. In a further embodiment, the organization module 208 positions the icons at a time before the occurrence of the calendar event, and the method 500 ends.

Figure 6:
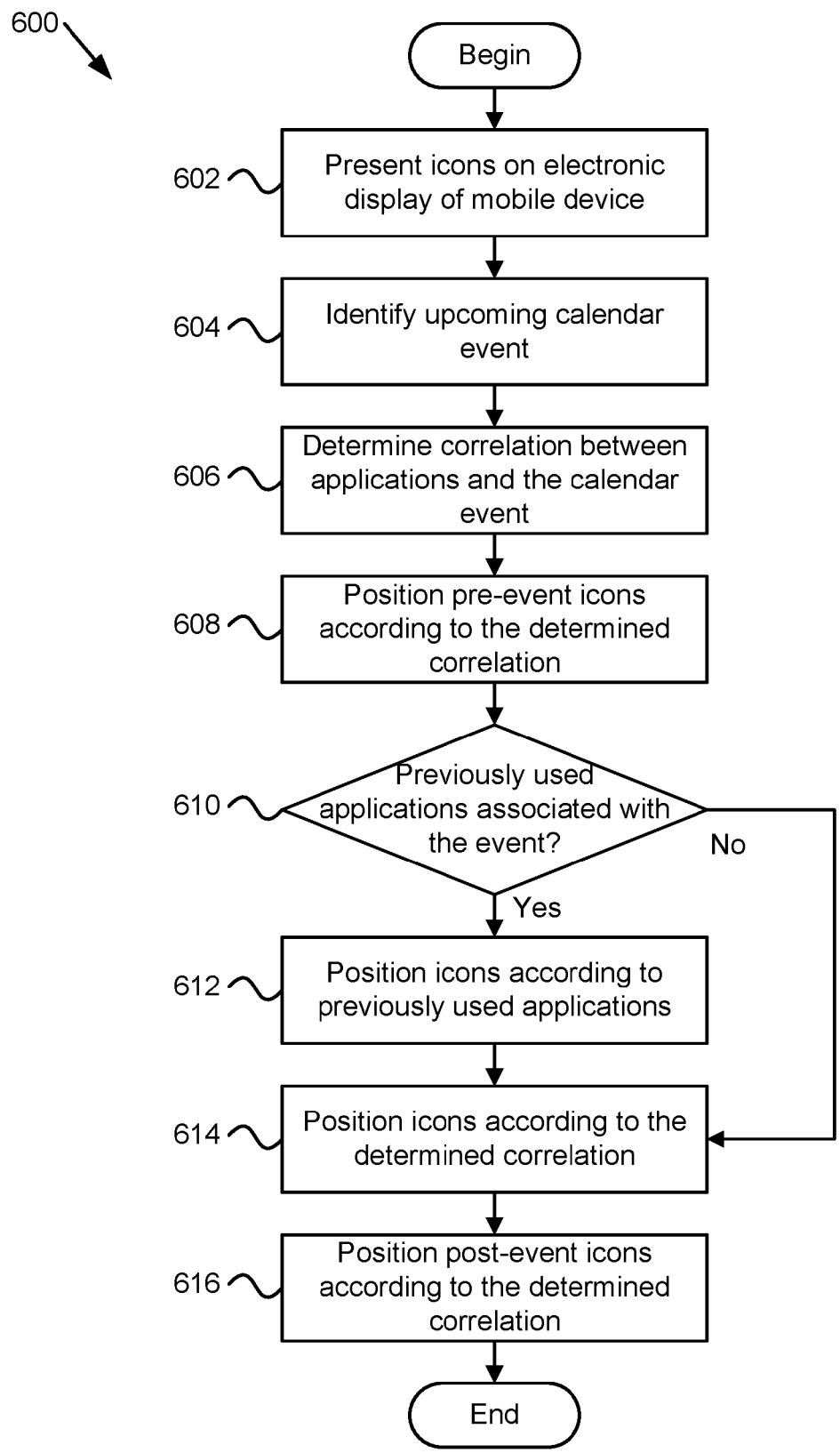
FIG. 6 is a schematic flow chart diagram illustrating another embodiment of a method for dynamically organizing applications based on a calendar event.

FIG. 6 depicts another embodiment of a method 600 for dynamically organizing applications based on a calendar event. In one embodiment, the method 600 begins and a display module 202 presents 602 a plurality of icons on an electronic display of a mobile device 106. In some embodiments, the icons represent applications configured to execute on the mobile device 106. In a further embodiment, an event module 204 identifies 604 an upcoming calendar event, which is on a calendar linked to the mobile device 106. A correlation module 206, in certain embodiments, determines 606 a correlation between an application and the calendar event by comparing one or more characteristics of the application to one or more characteristics of the calendar event.

In one embodiment, a pre-event module 302 positions 608 pre-event icons a predetermined amount of time prior to positioning non-pre-event icons such that pre-event icons are more visible than non-pre-event icons. The pre-event icons may include a subset of all the icons presented on the electronic display. In certain embodiments, the pre-event icons represent applications having a positive correlation to the calendar and determined to be useful during a time period just prior to the calendar event. A prior-use module 306 determines 610 whether there are previously used applications associated with the calendar event, which may be determined by the event type, name, description, and/or the like. If the prior-use module 306 determines there are applications that have been previously used with this calendar event, or one substantially like it, the prior-use module 306 positions 612 the icons representing the prior-used applications to be more visible than icons representing applications that have not been previously used with this type of calendar event, regardless the correlation of the application with the calendar event.

In one embodiment, an organization module 208 positions 614 the plurality of icons on the electronic display according to the determined correlation between the application and the calendar event. In some embodiments, the organization module 208 positions icons of the plurality of icons representing applications having a positive correlation to the calendar event to be more visible than icons of the plurality of icons representing applications that do not have a positive correlation to the calendar event. In a further embodiment, the organization module 208 positions the icons at a time before the occurrence of the calendar event.

In some embodiments, a post-event module 304 positions 616 post-event icons a predetermined amount of time after the calendar event such that post-event icons are more visible than non-post-event icons. The post-event icons may include a subset of all the icons presented on the electronic display. In certain embodiments, the post-event icons represent applications having a positive correlation to the calendar and determined to be useful during a time period just after the calendar event, and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
presenting a plurality of icons on an electronic display of a mobile device, each icon representing an application configured to execute on the mobile device;
identifying an upcoming calendar event, the calendar event on a calendar linked to the mobile device;
determining a correlation between the application and the calendar event by comparing one or more characteristics of the application to one or more characteristics of the calendar event, the one or more characteristics of the calendar event comprising information extracted from a description of the calendar event, and the one or more characteristics of the application comprising metadata for the application, wherein the correlation is determined based on a comparison of the information extracted from the calendar event and the metadata for the application;
positioning the plurality of icons on the electronic display according to the determined correlation between the application and the calendar event, wherein icons of the plurality of icons representing applications having a higher correlation to the calendar event are positioned to be more visible than icons of the plurality of icons representing applications that have a lower correlation to the calendar event, the icons being positioned at a time before the occurrence of the calendar event;
positioning the plurality of icons on the electronic display according to an application being used during a previous calendar event, the previous calendar event substantially similar to the upcoming calendar event, wherein icons of the plurality of icons representing applications that have been previously used are positioned to be more visible than icons of the plurality of icons representing applications that have not been previously used;
positioning pre-event icons a predetermined amount of time prior to positioning non-pre-event icons such that pre-event icons are more visible than non-pre-event icons, wherein at least a portions representing applications having a higher correlation to the calendar event are pre-event icons representing pre-event applications, a pre-event application comprising an application determined to be useful during a time period just prior to the calendar event; and
positioning post-event icons a predetermined amount of time after the occurrence of the event such that post-event icons are more visible than non-post-event icons, wherein at least a portion of the icons representing applications having a higher correlation to the calendar event are post-event icons representing post-event applications, a post-event application comprising an application determined to be useful during a period of time just after the calendar event.

2. The method of claim 1, wherein the icons of the plurality of icons representing applications having a higher correlation to the calendar event are positioned on one of a designated area of the electronic display and an available area on a designated home page of the electronic display.

3. The method of claim 1, further comprising positioning the plurality of icons on the electronic display according to a location associated with the calendar event, wherein icons of the plurality of icons representing applications having a higher correlation to the location associated with the calendar event are positioned to be more visible than icons of the plurality of icons representing applications that do not have a higher correlation to the location associated with the calendar event.

4. The method of claim 1, further comprising resetting the positioned icons of the plurality of icons to an original position in response to an expiration of the calendar event.

5. The method of claim 1, wherein an icon is configured to be a static icon such that the static icon cannot be positioned in response to positioning the plurality of icons.

6. The method of claim 1, further comprising ordering the positioned icons of the plurality of icons according to the determined correlation, wherein the positioned icons are ordered in descending order of correlation.

7. The method of claim 1, wherein the one or more characteristics associated with the calendar event comprises one or more of an event type, an event location, a name, a time, a keyword, and a description.

8. The method of claim 1, wherein the one or more characteristics associated with the application comprises one or more of user-defined metadata, application-defined metadata, an application name, a group name, and a description of the application.

9. The method of claim 1, wherein an icon group comprising a plurality of icons is positioned according to at least one application represented by an icon of the icon group having a positive correlation to the calendar event.

10. The method of claim 1, further comprising correlating one or more applications with a calendar event in response to a user associating the one or more applications with the calendar event.

* * * * *